July 23, 1963
H. L. CLARK
3,098,930
THERMO-ELECTRIC DETECTING DEVICE
Filed Jan. 5, 1945
2 Sheets-Sheet 2
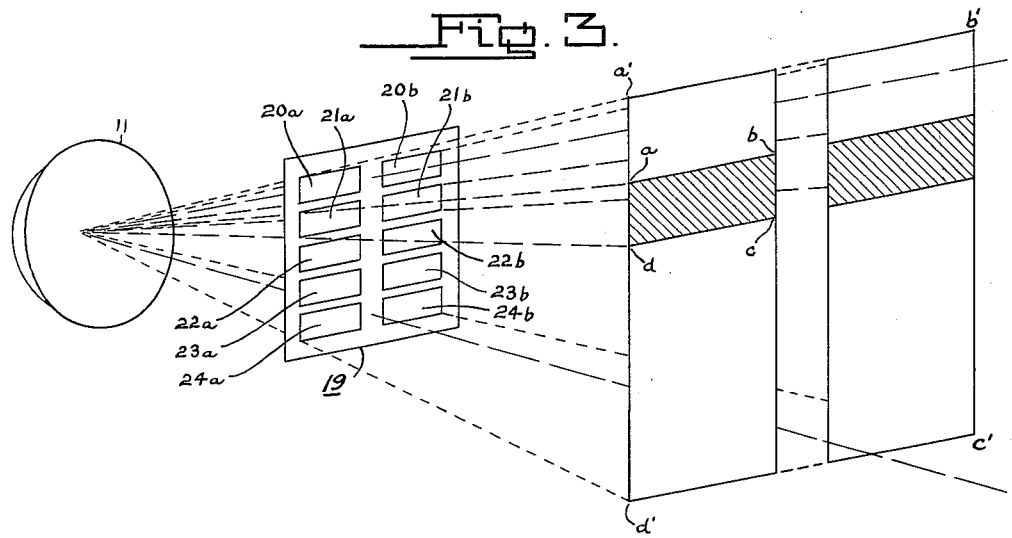
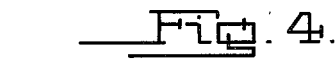
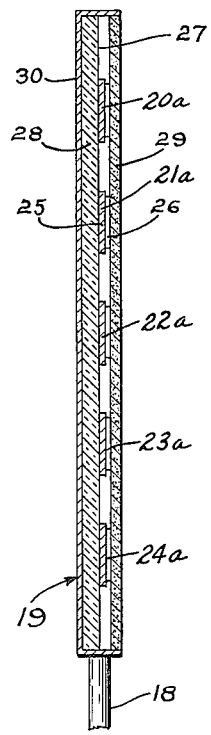
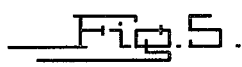
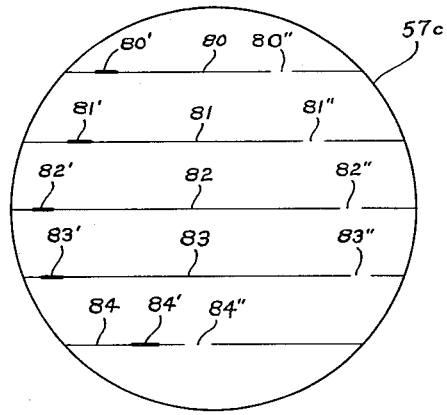
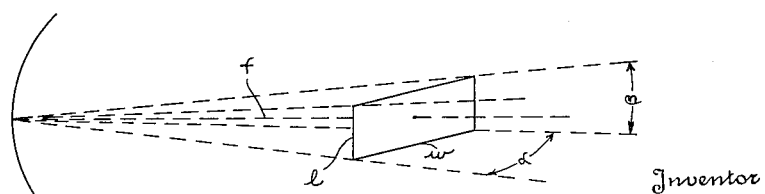

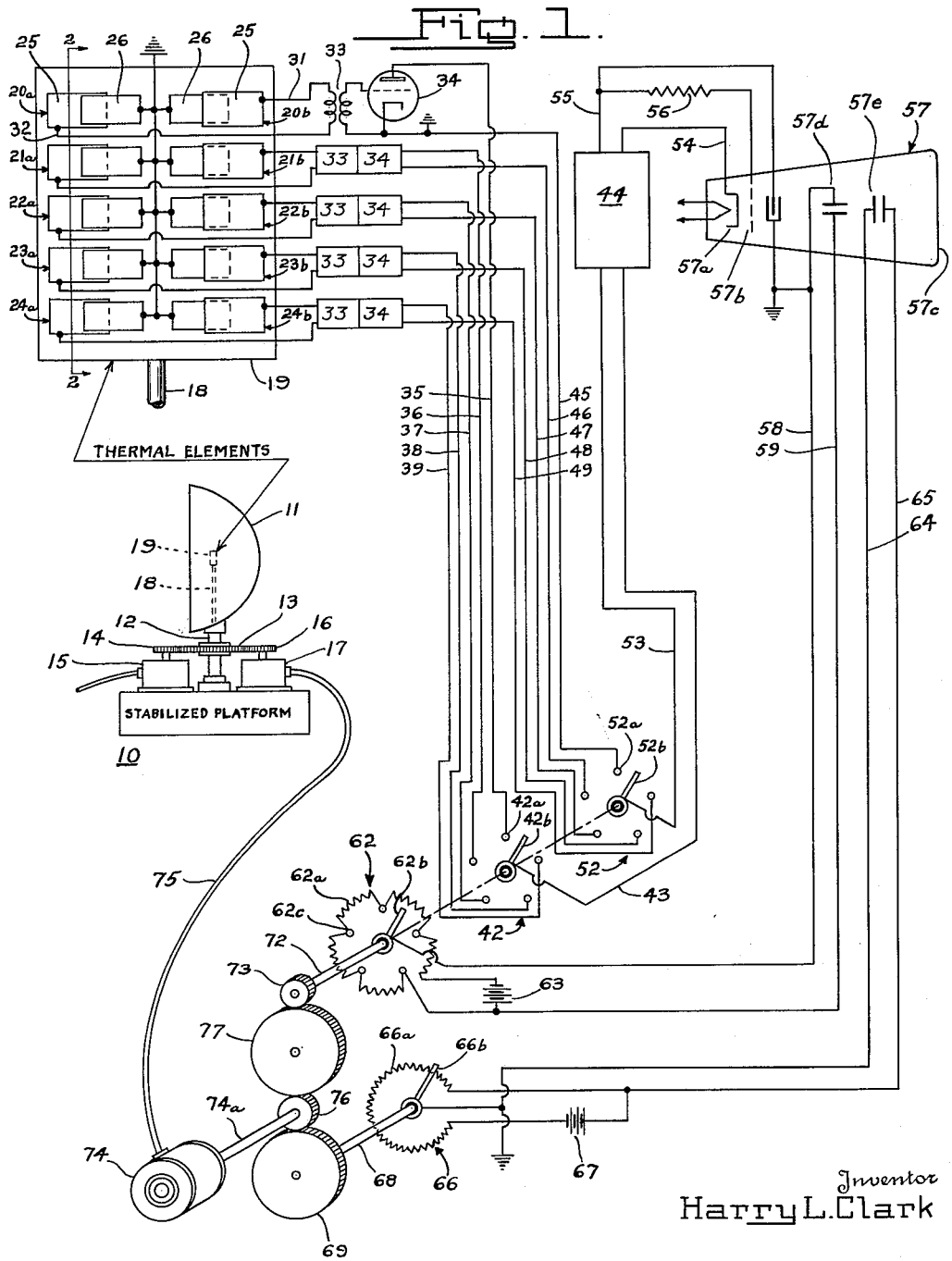

3,098,930
THERMO-ELECTRIC DETECTING DEVICE
Harry L. Clark, 1404 Oglethorpe St. NW.,
Washington 11, D.C.
Filed Jan. 5, 1945, Ser. No. 571,489
5 Claims. (Cl. 250—83.3)
(Granted under Title 35, U.S. Code (1952), sec. 266)

This invention relates to an improved apparatus for detecting objects at night, or in fogs, or under other conditions which render the object invisible to the human eye through the use of detectors which are responsive to energy given off by the object or objects and particularly that energy falling within the infra-red portion of the spectrum.

Apparatus of this kind has been known to the art for many years. One type, shown in U.S. Patent No. 1,542,937, issued June 23, 1925, includes a selenium cell or thermo-couple or other detector unit sensitive to infra-red radiation. The unit is placed at the focus of a parabolic reflector or other focusing device so that when the latter is pointed directly at the object giving off the radiations, the unit will be irradiated. As the focusing device is turned away from the object, irradiation of the detector unit ceases. An amplifier is usually associated with the detector unit so that as the latter becomes irradiated, a suitable signal is given to an operator.

In apparatus of this kind it is also present practice to mount a pair of detector units such as thermo-couples side by side and arrange them so that they produce an output signal only when irradiated by different amounts. When irradiated equally, they produce no signal. The thermo-couples are connected in opposite polarity. Thus when these are placed in the focal plane of a parabolic reflector and the reflector is scanned along the horizon, the detector units produce a positive signal (positive potential) as one of the units comes on the target, then no signal, then a negative signal (negative potential) as the other unit comes on the target and the first mentioned unit goes off the target. Plotted, the signal is somewhat the same in appearance as the positive and negative halves of a sine wave, although much more irregular in shape.

Unfortunately, cloud formations behind the target produce similar signals and this has given considerable difficulty to the art from a design point of view in developing a system in which the target to be detected is presented with sufficient clarity to distinguish it from other signals derived from the target's background. It has been found that by reducing the field of view of the optical system, the cloud or other background signals can be reduced without reducing the target signals for the reason that with a smaller field of view, the amount of sky and water background as "seen" by the detector unit is reduced.

The field of view of a parabolic mirror of focal length $f$ with a detector unit (thermo-couple) of $w$ width and $l$ length is pyramidal in shape with apex angles of $\alpha$ and $\beta$, where $$\alpha = \tan^{-1}\left(\frac{w}{f}\right)$$

and $$\beta = \tan^{-1}\left(\frac{l}{f}\right)$$

This is shown clearly in FIG. 5 of the accompanying drawings.

Furthermore, the smaller the size of the thermo-couple, the faster is their speed of response. Hence, present practice is to make them as small as possible ($\frac{1}{16}$" by $\frac{1}{8}$" to $\frac{1}{100}$" by $\frac{1}{10}$") to effect maximum sensitivity.

In order to make the system as sensitive as possible, it is desirable to make the collecting area, i.e. the diameter of the parabolic reflector, as great as possible. Thus in the present invention, relatively large diameter (24"–36") reflectors with a relatively long focal length of the order of 18" to 36" are used. These, together with thermo-couple units of the order of the size above stated, produce a very small field of view (1 minute by 3 minutes, approximately) which has given satisfactory operating characteristics.

Thus, it will now be evident that in order to realize maximum sensitivity and maximum target signal to background signal ratio in the present systems both from the standpoint of detector unit and reflector size, it is most essential to have the field of view as defined, as small as possible. However, this imposes a severe limitation on the application of the system on shipboard, as the pitching and rolling of the ship pulls the field of view of the detecting system off the horizon being scanned to locate a target such as an enemy ship. In order to improve matters, the detecting systems have been mounted on platforms rendered stable through the use of conventional gyro-vertical controls but even this has failed to completely eliminate the trouble, since so far the best available stabilization on shipboard has an error of ±7 minutes of arc in both level and cross-level. Thus with a satisfactorily small field of view (1 minute by 3 minutes) it is apparent that the detector unit cannot be kept on the target.

So far, the solution has been to decrease the sensitivity of the system by increasing the field of view to such an extent that the target is not lost during the scanning process. In present practice, this increase in the field of view is brought about by employing short focal length reflectors, but at a sacrifice in sensitivity because the collecting area of the relatively small diameter reflectors which must be used is necessarily small. Larger diameter reflectors with a short focal length, if of acceptable quality could be used to thereby produce an increased field of view without loss in sensitivity, but at the present time, high quality, short focal length, large diameter reflectors cannot be obtained since they are most difficult to grind to the necessary precision. Another disadvantage with the present practice is that with the larger field of view, the target is but a small spot in the total field of view. The differential action of the pair of thermal elements, previously described, is thus to compare the target and a lot of background with background adjacent the target. Since the background is not uniform, the net result is an unnecessarily small target signal to background signal ratio. The range at which any detecting system of this type can detect a target is thus limited by signals from the background rather than by the sensitivity of the system.

It is the object of this invention to provide a detecting system of the class described in which the benefits inherent in the use of relatively small detecting units, and which result in a small field of view, can be maintained and yet provide such an arrangement that the overall field of view will be large enough to permit the horizon to be scanned satisfactorily from a moving ship.

A more specific object is to provide a detecting system of the class described which includes a plurality of comparatively small, single or horizontally paired detector units arranged vertically, one below the other, in the focal plane of an energy collecting parabolic reflector. Each unit is isolated electrically from the others so as to prevent electrical shunting of other units. Each unit is as small as practical to attain maximum sensitivity or speed of response. The reflector is as large as practical so as to present a large collecting area. Since the reflector has a relatively long focal length, each unit in itself subtends a relatively small optical field of view. Enough of the units are arranged vertically so that the overall vertical field of view is greater than the errors in stabilization and the vertical angle below the horizon to be covered. As the optical system is scanned, it sweeps out a number of horizontal lines above and below the horizon, thus insuring that the target will always be in the overall field of view. The target's image may not fall on the same unit during successive scanning operations, but it will fall on one of them and that is all that is necessary. While the optical system scans horizontally, the electrical signals generated by each unit or pair of units in response to incoming infrared radiations are amplified and portrayed to an observer. In the present embodiment, the units are scanned electrically in a vertical direction while the optical system is being scanned horizontally. The vertical scanning rate is considerably higher than the horizontal scanning rate in order that the horizon may be swept at an acceptable rate. By the use of vertical scanning, only one final amplifier for all the units is necessary and the response of all units may be portrayed on a single oscilloscope screen. However, it is to be understood that the invention is deemed broad enough to include other kinds of portrayal means for indicating to the operator the response of each detector unit in the array. For example, each unit may have its own complete amplifier, the output of each going to its own respective stylus on conventional multi-stylus recorders of the electro-potential type wherein the styluses are caused to move horizontally as a unit across a chart to make a series of horizontal traces.

These and other objects of the invention will become more apparent from the following description and from the accompanying drawings which represent one embodiment of the invention.

In the drawings:

FIG. 1 is a combined diagrammatic and schematic diagram of the improved detecting system embodying this invention;

FIG. 2 is an enlarged sectional view taken on lines 2—2 of FIG. 1 showing the manner in which the detector units are supported;

FIG. 3 is a diagram illustrating the field of view subtended by each detector unit as well as the overall view subtended by the detector unit array;

FIG. 4 is a view of the screen of the oscilloscope used with the system for portraying target indication to an operator;

FIG. 5 is a diagram illustrating what is meant by the expression "field of view" as applied to a single detector unit mounted at the focal point of a parabolic reflector.

Referring now to the drawings, and particularly FIG. 1, there is shown at 10 a scanning head which includes a focusing or collecting device, such as a parabolic reflector 11, mounted upon a standard 12. The standard is suitably journaled for rotation about a vertical axis and carries a ring gear 13 which is meshed with a drive pinion 14. A reversible motor 15, under control of an operator, drives pinion 14 and hence the reflector 11 may be swept or scanned horizontally through any desired angle. Scanning of the reflector may cover the entire horizon relative to the ship upon which the apparatus is mounted, i.e., 360°, or it may be swept back and forth over a smaller angle.

It will be noted that ring gear 13 is also meshed with a pinion 16 which drives a self synchronous motion transmitting generator 17. Generator 17 may be of the well known "Selsyn" type and supplied with single phase A.C. power from a suitable source. The function of this generator will be explained hereinafter.

Standard 12, reflector 11, motor 15 and generator 17 are supported upon a platform which is stabilized in a horizontal plane. The stabilizing means has not been shown since its structure per se forms no part of this invention. Stabilizing devices are well known and usually employ a gyro-vertical in conjunction with a gimbal system which carries the platform. Any tendency for the platform to depart from a true horizontal plane is substantially neutralized by a realignment of the gimbal system. One suitable stabilizing system is described in U.S. Patent No. 2,093,503, issued September 21, 1937.

Mounted within the reflector 11 on a support 18, and in the focal plane of the reflector, is my improved detector unit assembly 19. Referring now also to FIG. 3, assembly 19 comprises a plurality of pairs of thermo-couples 20a—20b to 24a—24b, inclusive.

As used herein and in the claims, the expression "detector unit," is intended to include any device sensitive to infra-red radiation and effective to produce when energized by the radiation, an electromotive force, or other electrical quantity, or a change in an electromotive force, or other electrical quantity, applied to it. Examples of such devices and not by way of limitation, include: thermopiles, shown in U.S. Patent No. 1,343,393, which are built up of a number of thermo-couples that generate their own electromotive force when subjected to radiations; thermistors which are high resistances (2–10 megohms) with large temperature coefficients that are employed in a balanced bridge and, when subjected to radiations, unbalance the bridge to produce an electromotive force; bolometers which are low resistance thermistors (10–75,000 ohms); and the Hayes' cell, shown in U.S. Patent No. 1,954,204, which is a gas chamber in which the gas pressure varies with a change in radiation, thus causing a membrane to bow out or in. Motion of the membrane is then translated into corresponding changes in an electrical circuit.

However, in this application, in order to simplify illustration, each of the detector units is shown as comprising a single thermo-couple made up of a thin layer of bismuth 25 joined to a thin layer of silver 26. It will be noted in FIG. 2 that in each of the thermo-couples 20a–24a, the bismuth layer 25 underlies the silver layer 26 at their juncture, while in each of the thermo-couples 20b–24b, the bismuth layer 25 overlies the silver layer 26. The silver and bismuth layers 25 and 26, comprising the several pairs of thermo-couples, may be deposited directly upon insulation film 27 which may be an organic film such as polyethylene, or the layers may be made as separate units by a sintering process and then glued onto the insulation. The insulation film 27 is carried on the inner face of a quartz plate 28 and a rock salt window 29 covers the thermo-couple assembly. The whole may be mounted in a casing 30 and arranged in the focal plane of reflector 11 with the rock salt window 29 facing the reflector surface.

The rock salt window 29 is transparent to the infrared radiation and serves to isolate the thermo-couples from any local radiation effect which might otherwise produce a false response.

Referring now to FIG. 3, it is seen that with my novel arrangement of the detector units, the field of view subtended by each one is comparatively small, being the area $abcd$ while the overall view subtended by the entire detector array is quite large, being equal to the area $a'b'c'd'$.

As shown in FIG. 1 all of the silver layers 26 are connected to a common lead or to ground. Conductors 31, 32 lead from the bismuth layers 25—25 of each of the paired thermo-couples such as the pair 20a—20b to the primary of an input transformer 33, there being one such transformer for each pair. The secondary of each of these transformers is connected into the input grid circuit of a pre-amplifier 34 associated therewith. In the interest of simplifying the drawings, only the input transformer 33 and pre-amplifier 34 associated with the thermo-couples 20a—20b have been shown, the remainder being indicated by block diagram.

The anode circuits of the amplifiers are connected via conductors 35–39 to successive contacts 42a of a five-contact rotary switch 42 and a conductor 43 extends from a rotary contact arm 42b on this switch to the input of a summation amplifier 44. In a similar manner, the cathode circuits of all of the pre-amplifiers 34 are connected via conductors 45–49 to successive contacts 52a of a second five-contact rotary switch 52, and a conductor 53 extends from rotary contact arm 52b on this switch to the cathode circuit of amplifier 44. The output of amplifier 44 is connected via conductors 54, 55 and resistor 56 to the cathode 57a and brightening grid 57b of a cathode ray oscilloscope 57, the oscilloscope screen being identified by reference numeral 57c. Amplifier 44 is of conventional design and hence has been shown only in block diagram.

Oscilloscope 57 includes a pair of plates 57d to control deflection of the cathode ray beam in a vertical plane and a pair of plates 57e disposed at right angles to plates 57d for controlling deflection of the beam in a horizontal plane.

Associated with the vertical deflection plates 57d and connected thereto by conductors 58, 59 is a potentiometer 62 which includes five resistors 62a connected in series across a battery 63. Taps are made between the resistors 62a to contacts 62c. Rotary arm 62b of potentiometer 62 is connected to conductor 58, and conductor 59 connects with one side of battery 63 and also to the resistor 62a at the adjacent end of the resistor series. Thus as arm 62b rotates, it is evident that the potential applied to vertical deflection plates 57d from potentiometer 62 will be incremental, consisting of five steps and will hence cause the cathode ray beam to be correspondingly displaced at five positions along a vertical axis.

Associated with the horizontal deflection plates 57e and connected thereto by conductors 64, 65 is a second potentiometer 66 including a ring type resistance 66a connected across a battery 67. Rotary arm 66b of the potentiometer 66 is connected to conductor 64, and conductor 65 connects with one side of battery 67 and also to an end terminal of resistance 66a. Thus as arm 66b rotates, it is evident that the cathode ray beam will be swept along a horizontal axis, there being one complete sweep across the screen and a fly-back to the starting position for each complete revolution of arm 66b. Potentiometer arm 66b is mounted upon a shaft 68, the end of which carries a gear 69.

It will be noted that switch arms 42b, 52b and potentiometer arm 62b are all mounted upon a single shaft 72, the end of which carries a pinion 73, and that the arms are so aligned on the shaft that they come into engagement with correspondingly aligned contacts on the switches 42, 52 and potentiometer 62 simultaneously.

For rotating the shafts 68 and 72, a self-synchronous motor 74 is provided. This motor is electrically coupled to the self-synchronous generator 17, previously described, via cable 75 and, as is well known, follows faithfully the rotation of the generator. Driven by the shaft 74a of motor 74 is a pinion 76 which meshes with gears 69 and 77. The ratio of the gear train is such that shaft 68 rotates 1 to 1 with shaft 12 that carries reflector 11 while shaft 72 rotates at a much higher ratio.

It has been found that the period of switching applied to the detector units 20–24 should be about .1 of the time constant of a detector unit. The "time constant" may be defined as the time required for the output potential of the thermo-couple to build up to $1 - 1/e$ of its full value subsequent to irradiation, where $e = 2.71828$. Thus if the bismuth-silver thermocouple unit has a time constant of .01 sec., the time required for a complete switching cycle of the units, i.e., from the top unit 20 to the bottom unit 24 should not exceed .001 sec.

Furthermore the horizontal scanning rate of the array of detector units should be so related to the size of each unit that the target will be in full view of the unit for at least long enough to permit it to build up to approximately 80 percent of its full value.

Operation

The apparatus is put into operation by energizing motor 15. The latter may be set to rotate in one direction so that reflector 11 scans around the entire horizon (360°) or its direction may be periodically reversed so as to cause the reflector to oscillate back and forth over a particular sector of the horizon.

As reflector 11 scans horizontally, generator 17 will be driven and transmit like motion to motor 74. Rotation of motor shaft 74a acting through gears 76, 69 and shaft 68 causes contact arm 66b to rotate and thereby vary the potential applied to the horizontal deflecting plates 57e of oscilloscope 57. This causes the beam to sweep in a horizontal direction across the oscilloscope screen 57c in synchronism with the horizontal sweep of the reflector 11 across the horizon. The initial bias on the brightening grid 57b is such that under "no signal" conditions, i.e., when the thermo-couples are not being irradiated with infra-red energy from a target, the cathode ray beam will trace out basic faint lines on the oscilloscope screen.

Rotation of motor shaft 74a acting through gears 76, 77, 73 and shaft 72 causes contact arms 42b, 52b, and 62b to rotate. Rotation of contact arm 62b will vary, in steps, the potential applied to the vertical deflecting plates 57d of oscilloscope 57. Since the vertical deflection of the beam is very rapid, and in steps, and the oscilloscope screen 57c is of the long persistence type, the operator will thus see five separate faint lines being traced across the screen.

Rotation of contact arms 42b and 52b functions to apply the output from the pre-amplifiers 34 in succession to the summation amplifier 44 and thence onto the brightening grid 57b of oscilloscope 57.

It will be remembered that for any pair of thermo-couples, the silver layers 26 are connected together and to ground and that the bismuth layers 25 connected to the primary of transformer 33 overlie and underlie their respectively associated silver layers 26.

If we now assume that there is a ship target within the field of view of the paired thermo-couples 24a, 24b and that there is a cloud formation behind the target in the field of view of the four remaining thermo-couple pairs 20a, 20b, to 23a, 23b, both the target and cloud formation will emit infrad-red wave energy which will be picked up by the horizontally sweeping reflector 11 and concentrated in the focal plane thereof.

As the cloud comes into the field of view of the thermo-couples 20b–23b, there will be a positive potential generated in each. These potentials applied through transformers 33, pre-amplifiers 34, switches 42 and 52, and summation amplifier 44 change the potential on the brightening grid 57b of oscilloscope 57 with the result that each of the horizontal traces 80–83 being made on the oscilloscope screen 57c will darken at 80'–83' (see FIG. 4). Now as the cloud also comes into the field of view of the thermo-couples 20a–23a, there will be a negative potential generated in each. This is of course due to the fact that the thermo-couples comprising each pair are connected so as to produce potentials of opposite polarity. Since the thermo-couples comprising each of the four pairs, such as 20a–20b, are now being irradiated with equal intensity, the positive and negative potentials generated in each thermo-couple pair will also be equal. Being opposite in polarity, the potentials neutralize each other with the result that the potential applied to the brightening grid 57b is restored to its "no signal" value and the trace becomes lighter again.

Return now to the assumption that a ship on the horizon comes into the field of view of the thermo-couple pair 24a–24b. As the thermo-couple 24b is irradiated, the positive potential generated thereby produces a darkened portion 84' in oscilloscope trace 84. If the target ship's range and size of the thermo-couples 24a–24b bear such a relation to each other that the ship's image is very small (much less than the width of a thermo-couple), neither of the thermo-couples 24a—24b will be irradiated as the ship's infrad-red radiations, concentrated by the reflector 11, fall in the space between the two thermo-couples. Under these conditions, the potential applied to oscilloscope grid 57b reverts to its "no signal" value, and trace 84 becomes lighter again. Now as thermo-couple 24a becomes irradiated, a negative potential will be generated and the effect of this on the potential applied to oscilloscope grid 57b is such that the intensity of the beam is reduced to a value where it no longer is visible on the screen. Thus trace 84 blanks out at 84″ for as long as thermo-couple 24a is being irradiated. As the ship passes out of the field of view of thermo-couple 24a, the negative generated potential is reduced to zero. The potential on oscilloscope grid then reverts to its "no signal" value and the trace 84 again becomes visible.

Now as the cloud formation passes out of the field of view of thermo-couples 20b—23b, the positive potentials generated by these are reduced to zero, leaving only the negative potentials generated in thermo-couples 20a—23a with the result that the traces 80—83 are caused to blank out at 80″-83″. The blankout will be maintained until such time as the cloud formation passes out of the field of view of thermo-couples 20a—23a. When this occurs, the negative potentials will be reduced to zero with the result that traces 80-83 again become visible at a "no signal" intensity.

It will thus be seen that by properly interpreting the signals portrayed to the operator on the oscilloscope screen, one is able to identify the one or more targets which come into the field of view of the apparatus as the latter is scanned across the target field.

Of course, as previously explained, the target indication may not always appear in the same trace on the screen in successive scanning operations due to the pitch and roll of the ship on which the apparatus is mounted. However, the vertical dimension of the overall field of view of the array of detector units is such that the target will always be caught by one of the units.

In conclusion, it is to be understood that while the foregoing description represents a preferred embodiment of the invention, changes in the construction and arrangement of parts thereof may be made by those skilled in the art without departing from the spirit and scope of the invention as defined in the appended claims.

The invention described herein may be manufactured and used by or for the Government of the United States of America for governmental purposes without the payment of any royalities thereon or therefor.

What is claimed is:

1. Apparatus for determining the direction of a source of infrad-red radiation comprising a reflector arranged to concentrate the received radiation, a plurality of detector units mounted one above the other in the focal plane of said reflector, an oscilloscope, means for scanning said reflector horizontally, means synchronized with operation of said reflector scanning means for applying a linear sweep voltage to the horizontal beam deflection means on said oscilloscope, means for applying an incremental voltage to the vertical deflection means on said oscilloscope whereby a plurality of parallel horizontal lines will be traced simultaneously across the screen of said oscilloscope, switching means for electrically scanning the outputs of said detector units, and means connecting said switching means in circuit relation with the brightening grid of said oscilloscope whereby target indication will be portrayed to the operator by a change in intensity of the beam traces appearing on the screen.

2. Apparatus for determining the direction of a source of thermal radiation comprising a reflector for concentrating the received radiation, a plurality of thermal detecting units each comprising a pair of thermal responsive electrical elements connected in electrical opposition to each other, said thermal responsive electrical elements of the several detecting units being secured in a single plane and so mounted as to receive said concentrated radiation from said reflector, and means for sequentially portraying the response of said pairs of thermal responsive electrical units.

3. Apparatus for determining the direction of a source of thermal radiation comprising a reflector for concentrating the received radiation, power means for repetitiously rotating said reflector about an axis to scan a desired arc, a plurality of thermal detecting units each comprising a pair of thermal responsive elements connected in electrical opposition to each other, said thermal responsive electrical elements of the several units being secured in a single plane and so mounted as to receive the concentrated radiation from said reflector, and means for sequentially portraying the response of said pairs of thermal responsive electrical elements.

4. Apparatus for determining the direction of a source of thermal radiation comprising a reflector for concentrating the received radiation, power means for repetitiously revolving said reflector about an axis to scan a desired arc, a plurality of thermal detecting units, each comprising a pair of thermal responsive electrical elements connected in electrical opposition to each other, said thermal responsive elements of the several detecting units being secured in a single plane and so mounted as to receive the concentrated radiation from said reflector, and mechanical switching means for sequentially connecting said pairs of thermal responsive elements to a cathode ray tube for portraying the response of said elements.

5. Apparatus for determining the direction of a source of infra-red radiation comprising a reflector for concentrating the received radiation, means for repetitiously rotating said reflector about an axis to scan a desired arc, a plurality of thermal detecting units, each comprising a pair of thermal responsive electrical elements connected in electrical opposition with each other, said thermal responsive electrical elements of the several detecting elements being secured in a single plane and so mounted as to receive said concentrated radiation from said reflector, means synchronized with said scanning means for applying a linear sweep voltage to a cathode ray tube, and mechanical switching means for sequentially connecting said pairs of thermal responsive elements to said cathode ray tube for portraying the response of said pairs thereon.

References Cited in the file of this patent

UNITED STATES PATENTS

| | | |
|---|---|---|
| 1,343,393 | Hoffman | June 15, 1920 |
| 2,121,771 | Jones | June 21, 1938 |
| 2,125,113 | Kling | July 26, 1938 |
| 2,288,766 | Wolff | July 7, 1942 |
| 2,306,272 | Levy | Dec. 22, 1942 |
| 2,319,195 | Morton | May 11, 1943 |
| 2,334,085 | Graves | Nov. 9, 1943 |
| 2,392,873 | Zahl | Jan. 15, 1946 |